United States Patent [19]

Charns et al.

[11] 3,829,124

[45] Aug. 13, 1974

[54] BLEED CAP FOR A VEHICLE AIR CUSHION INFLATOR

[75] Inventors: Norman Charns, Southfield; Leo J. Matthews, Bloomfield Hills, both of Mich.

[73] Assignee: General Motors Corporation, Detroit, Mich.

[22] Filed: July 16, 1973

[21] Appl. No.: 379,625

[52] U.S. Cl. ............... 280/150 AB, 137/580, 222/3
[51] Int. Cl. .......................................... B60r 21/08
[58] Field of Search ............. 280/150 AB; 222/3, 5; 137/587, 580

[56] References Cited
UNITED STATES PATENTS

| | | | |
|---|---|---|---|
| 2,731,105 | 1/1956 | Nijland | 137/587 |
| 3,413,992 | 12/1968 | Yaale | 222/5 |
| 3,778,083 | 12/1973 | Hamasaki | 280/150 AB |

*Primary Examiner*—Robert B. Reeves
*Assistant Examiner*—Thomas E. Kocovsky
*Attorney, Agent, or Firm*—J. A. Kushman

[57] ABSTRACT

A bleed cap for a vehicle air cushion inflator includes an elongated receptacle whose ends define first and second aligned apertures that carry respective annular seal arrangements. The seal arrangement at the first end of the receptacle is adaptable to seal with the inflator and encompass the inflator outlet so that pressurized gas discharged from the inflator is received by the receptacle. A headed attachment bolt with an elongated shank is received within the receptacle extending between the seal arrangement at the second aperture and an externally threaded member at the inflator outlet. The unheaded end of the bolt includes a threaded counterbore that threads onto the externally threaded member so as to seal the headed end of the bolt against its adjacent seal arrangement and to secure the cap to the inflator. A passage in the bolt communicates the interior of the receptacle with the environment and includes an outer frustoconical end portion that is axially aligned with the shank of the bolt and threaded so as to receive an orificed frustoconical plug for bleeding the pressurized gas received within the receptacle to the environment.

3 Claims, 1 Drawing Figure

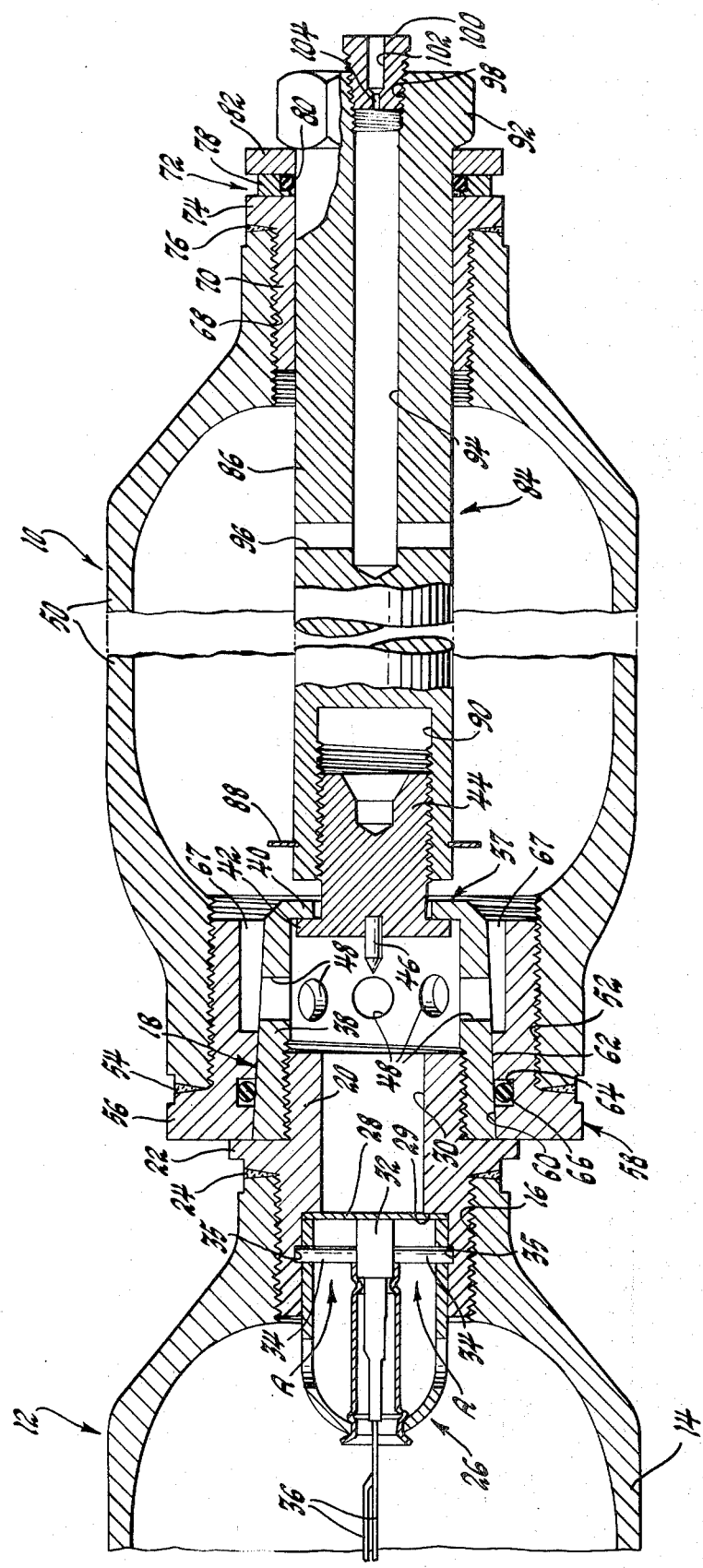

BLEED CAP FOR A VEHICLE AIR CUSHION INFLATOR

BACKGROUND OF THE INVENTION

This invention relates to a cap for an inflator that is used with a vehicle occupant restraint cushion.

Inflators for vehicle occupant restraint cushions are known and may be of the stored gas type, the gas generating type, or a hybrid of these two former types. Regardless of which type is selected for use in a particular vehicle restraint cushion system, the gas outlet of the inflator is generally connected to a manifold that feeds the cushion. Thus, prior to assembly of the inflator to the restraint cushion system and at any subsequent time when the inflator is disassembled from the system, the gas outlet is not fed to the manifold.

SUMMARY OF THE INVENTION

This invention provides a bleed cap for attachment to a vehicle occupant restraint cushion inflator at times when the inflator is not assembled to a restraint cushion system so as to receive the pressurized gas discharged from the inflator and to slowly bleed this gas to the environment. The cap includes an elongated receptacle whose opposite ends define aligned first and second apertures which carry respective annular seal arrangements. The receptacle is positioned with the seal arrangement of the first aperture encompassing the outlet of the inflator so that gas discharged through this outlet is received within the receptacle. A headed bolt extends through the seal arrangement of the second aperture and has a threaded counterbore that threads onto a cooperable externally threaded ember on the inflator adjacent its outlet. The head of the bolt seals against the seal arrangement of the second receptacle aperture as this threading proceeds and also secures the cap in position on the inflator. A central portion of the bolt head defines a threaded frustoconical portion of a passage that communicates the interior of the receptacle with the environment A frustoconical plug is threadingly received within this frustoconical portion of the passage and defines a bleed orifice for slowly venting pressurized gas received within the receptacle from the inflator to the environment.

BRIEF DESCRIPTION OF THE DRAWING

The objects, features and advantages of the present invention are readily apparent from the following detailed description of the preferred embodiment and the single FIGURE of the drawing which shows a bleed cap according to this invention attached to a vehicle occupant restraint cushion inflator so as to receive gas discharged from the inflator and to slowly vent this gas to the environment.

DETAILED DESCRIPTION OF THE PREFERRED EMBODIMENT

Referring to the drawing, a bleed cap according to this invention is generally indicated by 10 and is shown attached to an inflator 12 for a vehicle occupant restraint cushion. Although this inflator is well known and does not constitute a portion of this invention, it will be described so as to insure an understanding of the manner in which the bleed cap is adapted to function with the inflator.

The inflator shown is of a hybrid type that both stores pressurized gas and utilizes a gas generator that is not shown to generate a pressurized gas upon a suitable signal indicating that the inflator is to operate. The inflator includes an elongated gas receptacle 14 of a tubular configuration and the right-hand end of this receptacle defines a threaded aperture 16. An outlet assembly 18 of the inflator is mounted on receptacle 14 at this aperture so as to provide an outlet for stored and generated gas discharged from the receptacle 14. This outlet assembly includes an annular outlet member 20 whose left-hand end is threaded into the aperture 16 of the gas receptacle 14. The left-hand side of an external annular flange 22 of the outlet member is welded to the end of receptacle 14 by an annular weld 24 to thus provide a seal between these components.

A detonator 26 is received by the left-hand end of the outlet member 20. The right-hand end of the detonator engages and seats a diaphragm 28 against an annular seat 29 of the outlet member so as to close the left-hand end of a discharge aperture or outlet 30 defined by outlet member 20. A charge 32 is located at the central portion of the diaphragm by a pair of pins 34 that extend radially outward through the detonator and to within suitable apertures 35 in the left-hand end of outlet member 20. These pins are force fitted into position to securely locate the detonator so that it maintains the diaphragm 28 in position preventing gas within receptacle 14 from flowing along the path of arrows A outwardly through outlet 30. A pair of leads 36 are connected to charge 32 so as to fire this charge and thereby rupture the central portion of diaphragm 28 as gas is generated within the inflator. The firing of the charge also propels the diaphragm to the right through the outlet 30 of outlet member 20.

A reaction subassembly 37 of outlet assembly 18 includes an annular member 38 which has a slightly tapered or frustoconical configuration. This member is threaded onto the right-hand end of outlet member 20 and engages the right-hand side of flange 22 opposite weld 24. The right-hand end of this member 38 includes an inwardly extending annular flange 40 that is interengaged in an overlapping manner with an outwardly extending annular flange 42 of an attachment member 44 of subassembly 37. The flanges 40 and 42 are suitably secured to each other as by spot welding. The right-hand end of member 44 is threaded to allow attachment of inflator 12 to a vehicle restraint cushion manifold or to the bleed cap 10 of this invention. A pointed pin 46 is mounted within an aperture in the central portion of the left-hand end of member 44 by a force fit. Pin 46 is received within the ruptured central portion of diaphragm 28 as the charge 32 propels the diaphragm to the right and thus prevents the diaphragm from moving radially and blocking gas flow through radial discharge ports 48 in member 38. The manner in which reaction subassembly 37 allows only radial discharge of gas through ports 48 prevents an axial thrust flow of the gas as it leaves the inflator 12.

The bleed cap 10 of this invention includes an elongated gas receptacle 50 of a tubular configuration. The left-hand end of this receptacle 50 defines a threaded first aperture 52. This end of the receptacle is secured by an annular weld 54 to an annular member 56 of an annular seal arrangement 58 after being threaded onto the annular member. The inner surface 60 of member 56 has a frustoconical configuration and is adapted to seat against the complementary frustoconical surface 62 on the outer side of member 38 of reaction subassembly 37 when cap 10 is mounted on the inflator in the manner shown. This surface 60 is interrupted by an annular groove 64 that receives an O-ring seal 66 seating against surface 62. The left-hand end of member 56 seats against the right-hand side of the flange 22 on outlet member 20. The right-hand side of member 56 has a reduced thickness that provides an annular passage 67 communicating the gas discharge ports 48 of member 38 with the interior of the receptacle 50. The right-hand end of receptacle 50 defines a threaded second aperture 68 that is aligned with the first aperture 52 and receives a threaded member 70 of a second annular seal arrangement 72. Member 70 includes a flanged head 74 that is welded to the adjacent end of receptacle 50 by an annular weld 76. A washer 78 to the right of head 74 carries an O-ring seal 80 and is positioned to the left of a somewhat larger washer 82.

An attachment bolt 84 is inserted through seal arrangement 72 so that the left-hand end of its shank 86 is received in proximity to the threaded member 44 of reaction subassembly 37. Prior to the attachment of bleed cap 10 on inflator 12, a snap ring 88 is snaped into an annular groove on the left-hand end of bolt shank 86 so as to prevent subsequent movement of the bolt back through the seal arrangement 72. This left-hand end of shank 86 defines a threaded counterbore 90 which threadingly receives the threaded member 44 as the head 92 of the bolt is rotated. The bolt head 92 engages the larger washer 82 as this threading proceeds so as to thereby securely attach the bleed cap 10 to inflator 12 and also provide a seal between the bolt and the right-hand end of receptacle 50.

The right-hand end of bolt 84 defines an axial passage 94 concentric with the axis of bolt shank 86. The left-hand end of passage 94 communicates with radial passages 96 whose outer ends are in communication with the interior of receptacle 50. The right-hand end of passage 94 includes a threaded frustoconical outer portion 98 that tapers inwardly at the bolt head 92. A threaded frustoconcial plug is received within the threaded portion 98 so as to generally close the end of passage 94. The frustoconical configuration of the plug causes it to "bottom out" as it threads into the bolt and to thereby provide good sealing characteristics. This plug 100 defines an axial passage 102 whose right-hand end communicates with the environment and whose left-hand end defines a bleed orifice 104 in communication with the larger passage 94.

When the inflator 12 is attached to bleed cap 10 instead of an air cushion restraint system of a vehicle, gas discharged from the inflator will be received within the gas receptacle 50 and will escape to the environment only through the passageway defined by the bolt and the bleed orifice 104 of plug 100. Thus, the pressurized gas is vented slowly or bled to the environment as it leaves the receptacle 50.

This invention thus provides a bleed cap for a vehicle air cushion inflator.

What is claimed is:

1. A bleed cap for the outlet of a vehicle air cushion inflator, the cap comprising, a generally enclosed receptacle having opposed portions defining first and second apertures in alignment with each other, the receptacle being adaptable to engage the inflator in a generally sealing manner with the first aperture encompassing the inflator outlet so that pressurized gas discharged from the inflator is received by the receptacle, an elongated attachment member received within the receptacle so as to extend between the outlet of the inflator and the second aperture of the receptacle, the end of the attachment member adjacent the outlet being threaded so as to thread to a cooperable threaded member on the inflator, sealing means extending between the other end of the attachment member and the receptacle so as to generally seal this aperture and to secure the cap to the inflator, and a bleed passage defined by the attachment member so as to communicate the interior of the receptacle and the environment through the second aperture of the receptacle such that pressurized gas received by the receptacle from the inflator is slowly bled to the environment.

2. A bleed cap for the outlet of a vehicle air cushion inflator, the cap comprising, an elongated receptacle whose ends define first and second apertures that are aligned with each other, first annular sealing means mounted on the receptacle adjacent the first aperture thereof and adaptable to sealingly engage the inflator while encompassing the inflator outlet so that pressurized gas discharged from the inflator is received by the receptacle, second annular sealing means mounted on the receptacle adjacent the second aperture, a headed attachment bolt having an elongated shank received within the receptacle so as to extend between the inflator outlet and the second aperture, the end of the attachment member adjacent the outlet being threaded so as to thread to a cooperable threaded member on the inflator, the headed end of the bolt sealing with the second annular sealing means as this threading proceeds so as to seal the second aperture and to secure the cap to the inflator, and a bleed passage defined by the bolt so as to communicate the interior of the receptacle and the environment through the second aperture of the receptacle such that pressurized gas received by the receptacle from the inflator is slowly bled to the environment.

3. A bleed cap for the outlet of a vehicle air cushion inflator, the cap comprising, an elongated receptacle whose ends define first and second apertures that are aligned with each other, first annular sealing means mounted on the receptacle adjacent the first aperture and adaptable to sealingly engage the inflator while encompassing the inflator outlet so that pressurized gas discharged from the inflator is received by the receptacle, second annular sealing means mounted on the receptacle adjacent the second aperture, a headed attachment bolt having an elongated shank received within the receptacle and extending between the inflator outlet and the second aperture, the unheaded end of the bolt having a threaded counterbore for threading on a cooperable externally threaded member of the inflator adjacent the outlet thereof, the headed end of the bolt seating with the second annular sealing means as this threading proceeds so as to seal the second aperture and to secure the cap to the inflator, the bolt defining a passage communicating the interior of the receptacle and the environment through the second aperture of the receptacle, the outer end of the passage being axially aligned with the shank of the bolt and having a frustoconical configuration that tapers inwardly and is threaded, and a threaded frustoconical plug threadingly received by the outer end of the passage and defining a bleed orifice in communication with the passage and the environment such that pressurized gas received within the receptacle from the inflator is slowly bled to the environment.

* * * * *

PO-1050
(5/69)

UNITED STATES PATENT OFFICE
CERTIFICATE OF CORRECTION

Patent No. 3,829,124    Dated August 13, 1974

Inventor(s) Norman Charns and Leo J. Matthews

It is certified that error appears in the above-identified patent and that said Letters Patent are hereby corrected as shown below:

Column 1, line 34, the word "ember" should read the word -- member --.

Column 1, line 42, after the word environment there should be a period.

Column 3, line 25, the word "snaped" should read -- snapped --.

Column 3, line 43, "frustoconcial" should read -- frustoconical --.

Signed and sealed this 29th day of October 1974.

(SEAL)
Attest:

McCOY M. GIBSON JR.                C. MARSHALL DANN
Attesting Officer                  Commissioner of Patents